Feb. 9, 1971    J. V. JOHNSTON    3,561,129
NORTH-SEEKING SYSTEM
Filed Dec. 27, 1966    3 Sheets-Sheet 1
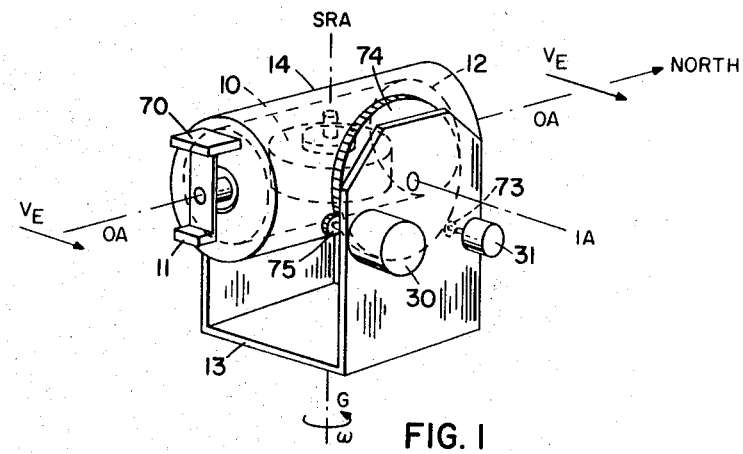
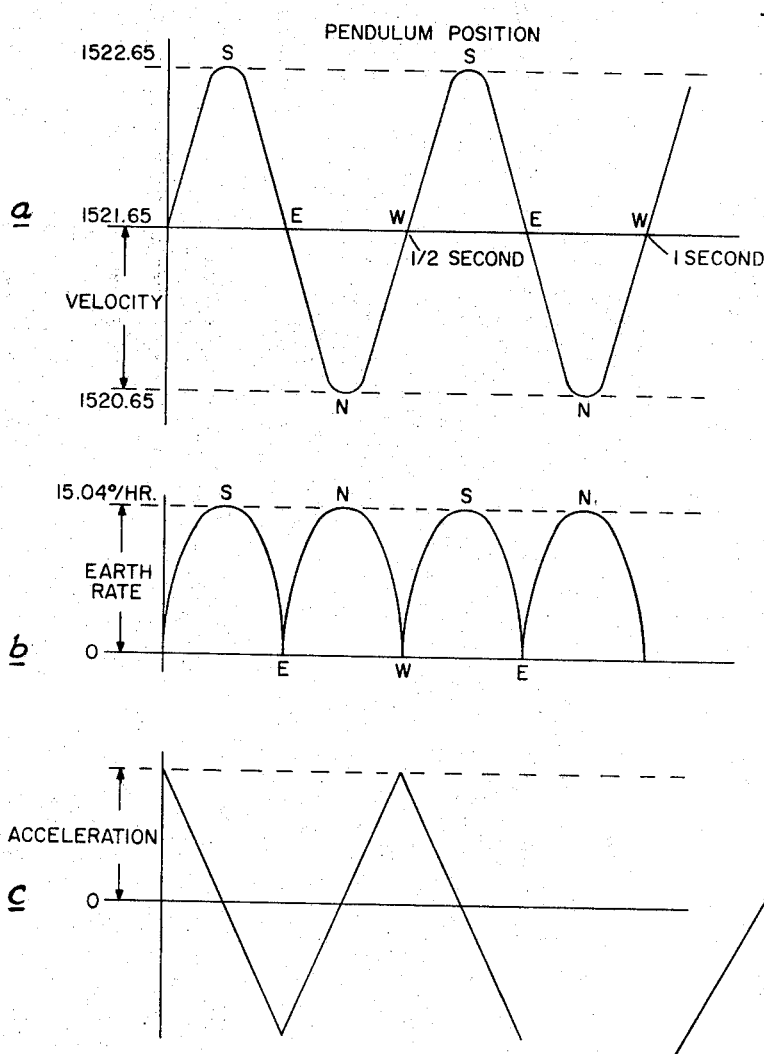
James V. Johnston,
INVENTOR.
BY Harry M. Saragovitz
Edward J. Kelly
Herbert Berl
Aubrey J. Dunn United States Patent Office 3,561,129
Patented Feb. 9, 1971

3,561,129
NORTH-SEEKING SYSTEM
James V. Johnston, Madison, Ala., assignor to the United States of America as represented by the Secretary of the Army
Filed Dec. 27, 1966, Ser. No. 605,110
Int. Cl. G01c 19/38
U.S. Cl. 33—226                      3 Claims

ABSTRACT OF THE DISCLOSURE

A system using a pendulous, integrating, gyroscope accelerometer rotated about its gravity axis, in a level plane on the earth. The rotation velocity of the earth causes the pendulous mass to exert a varying precessional force on the gyroscope. The force is detected and correlated with the angular position of the accelerometer to determine north.

---

There are many patents related to gyroscopic compasses. An example of such a patent is U.S. Pat. No. 3,146,530, issued Sept. 1, 1964, of which I was joint inventor. The references cited in this patent show various other gyroscopic compass schemes.

The present invention is a north-seeking system employing the type of gyroscopic accelerometer as shown by U.S. Pat. No. 2,925,736 to F. K. Mueller, issued Feb. 23, 1960. This accelerometer is employed in a unique manner in the invention. Basically, the accelerometer gyroscope precession axis is rotated in a plane about an axis approximately perpendicular to an earth tangent plane. The axis of rotation coincides with the quiescent position of the gyroscope's spin axis SA.

The invention takes advantage of the rotational velocity of the earth. A mass having a planetary rotation about a non-polar axis perpendicular to the surface of the earth, in a portion of each revolution, is moving relative to the earth's surface in the same direction as the adjacent surface of the rotating earth, and in another portion, is rotating in an opposite direction to the earth's rotation.

The accelerometer of the Mueller patent mentioned above has an unbalanced mass as a sensitive element. The accelerometer as shown in FIG. 1 in the patent is used in its entirety in the instant invention, and is mounted for rotation about the quiescent or datum position of the gyroscope's spin axis. As the Mueller device rotates, the unbalanced mass therein exerts a varying precessional force on the gyroscope. The precession resulting from this force may be picked off by a resolver. The output of the resolver can be used, in combination with an angle measuring means, to indicate north.

An object of this invention is to provide a novel north-seeking system.

Another object is to provide a north-seeking system employing a pendulous, integrating, gyroscope accelerometer as the basic sensing element.

These, and other objects may be realized by the following described invention, which may be best understood by reference to the drawing, in which:

FIG. 1 shows a pictorial view of the accelerometer of Mueller.

FIG. 2 shows various wave forms associated with the inventive device.

Figure 3:
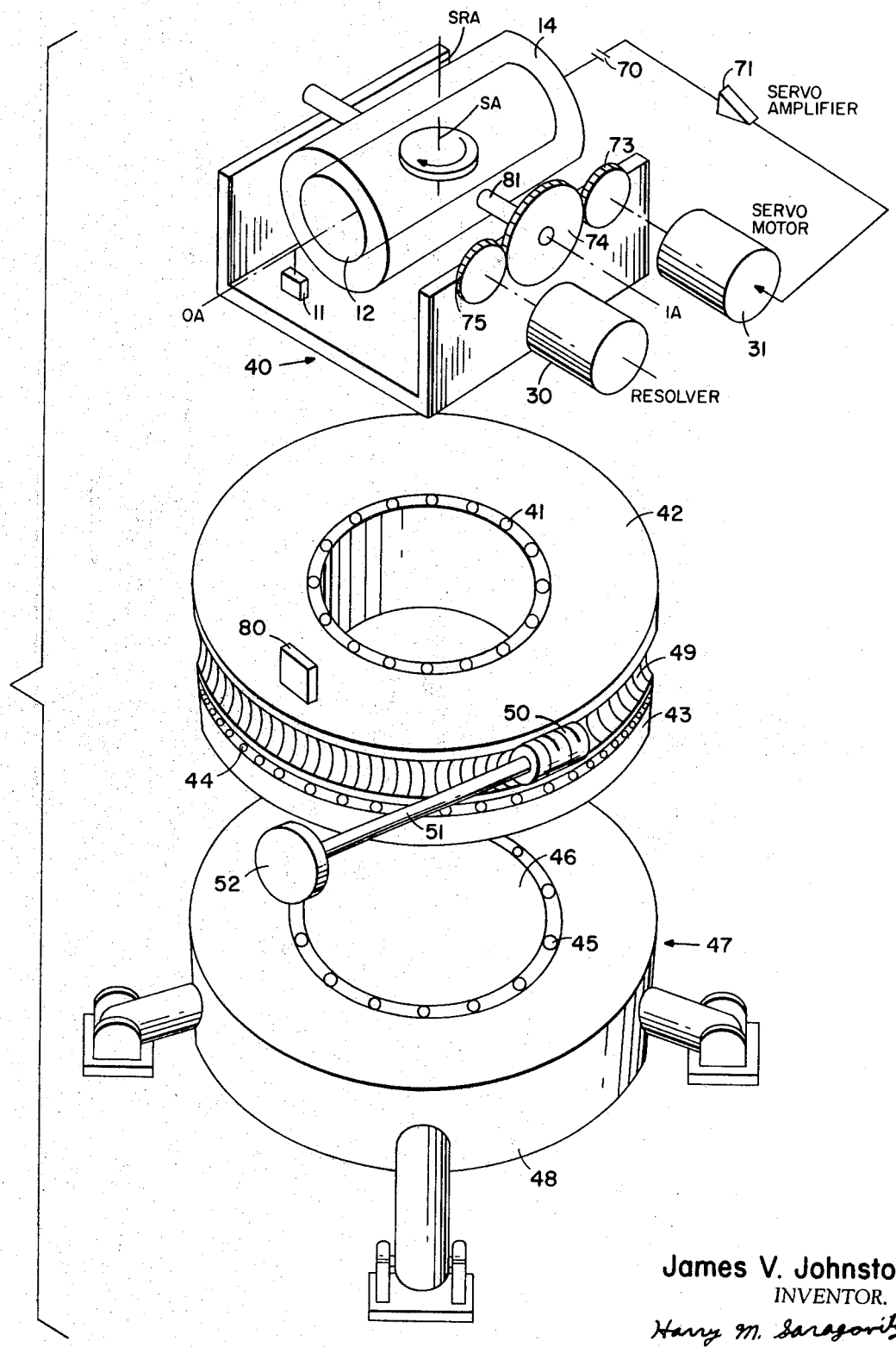
FIG. 3 shows a partial schematic view of the invention.

Referring now to FIG. 1, numeral 10 designates the rotor of the gyroscope of the accelerometer, and OA is the output axis. Rotor 10 having a spin axis (SA) is supported by an inner housing 12, with a pendulous weight 11 attached, which housing is rotatable a few degrees about OA relative to housing 14, which housing has a spin reference axis (SRA) representing the quiescent or datum position of the rotor spin axis. A frame 13 supports the outer housing 14 and allows motion of the housing 14 about an input axis designated IA. Frame 13 is constructed with a rotational axis in the vertical or gravity axis G. The instant OA, IA, and SA axes correspond respectively to the S, P, and G axes of FIG. 1 of the Mueller patent. The instant vertical rotation axis G has no equivalent in Mueller. The two vectors shown as $V_E$ represent the earth's peripheral velocity. This velocity at the equator is 1521.65 feet per second, and is mutually perpendicular to both gravity and the earth's spin axis, which is north. When the output axis (OA) is horizontal and aligned along the north direction, the pendulous mass is in the most sensitive position to react to any acceleration in the $V_E$ direction. The velocity ($V_E$) is based on the radius of the earth and the rotational rate at which the earth is spinning and can be expressed as a vector that points due east and whose magnitude is maximum when measuring 90° to the earth's spin vector. Thus:

$$V_E = \omega_E R \cos \psi$$

where
$\omega_E$ = earth's spin vector;
$\psi$ = latitude; and
$R$ = radius of earth.

As the OA of the gyro accelerometer rotates in a horizontal plane about a vertical axis, the pendulous mass will be subjected to effective varying magnitudes of the $V_E$ vector. These effective magnitude variations, when resulting from rotation of the frame rotational axis itself with the earth, develop varying Coriolis forces as the mass rotates toward the east and west. Since the pendulous mass is free to rotate only about the OA axis, when the OA axis is pointed in an easterly direction, the pendulous mass will not respond to any force generated by the earth's tangential velocity or to Coriolis forces. However, when the OA is in the north-south plane, the pendulous mass is free to swing in the same plane as the tangential velocity of the earth. If the accelerometer were placed in a static condition with the OA in the north-south plane, the tangential velocity would not create a force to move the mass. However, as the pendulous mass is rotated into and out of the tangential velocity vector, it is subjected to Coriolis forces. At the same time, the precessional rate of the spin axis (SA) is precisely equal to the earth's rate of 15.04° per hour about the SRA. In this orientation of OA and IA, the SA will always precess counterclockwise when viewed from the south end of the OA. That is to say, the SA is spaced fixed and the earth rotates beneath the gyroscope. The SA of the gyro is directly connected to the G-axis or pendulous mass. The SRA is not connected to the pendulous G mass and, therefore, cannot move about the OA due to G forces. The SA will precess or attempt to rotate within its housing 14 from G forces. When the housing moves, the pickoff 70 (FIG. 3) will sense the motion and send a signal to the servo motor 31. This motor will rotate 14, which contains the SRA, about the IA. When the frame 13 is rotated 90°, the OA is in the east-west plane and the IA is in the north-south plane. The SA cannot precess toward the west in this orientation, since the only freedom of motion of the SA is about the OA which in this orientation allows motion only in the north-south plane. For the SA and SRA to be maintained in a clockwise rotational direction, viewed along the OA looking toward north, the force of the gravitational mass 11 must cause the SA to remain vertical as the earth rotates. However, when the mass 11 is hanging directly down along the gravity direction, no torque is applied about the OA. If the mass is not hanging directly down but is at some small angle $\theta$ out of the vertical, a torque is developed. This torque is equal to the force (MA), times the moment arm (which is equal to the radius arm of the mass 11), times the sign of $\theta$. For small angles, obviously, this torque will be small. Starting from a condition with mass 11 hanging directly vertical, no torque is generated to oppose the motion of the gyro spin axis. Therefore, the gyro OA will appear to move in a counter-clockwise direction, or to remain space fixed. As the OA does move, a counter torque is generated by the mass moving out of the vertical axis. When the gyro's precessional torque exactly balances the torque of the mass arm, the OA counter-clockwise motion stops and begins to move in the opposite direction (clock-wise). The SA will lag behind the SRA by some angle. This angle will be a function of the relation of the angular momentum (H) of the gyro and the weight of mass in grams. The gyro torque equation is $T=H\omega$, where $\omega$ is equal to 15.05 degrees/hr. at the equator. The opposing torque is $T=MAR \sin \theta$, where M is a mass, A is the acceleration of gravity, R is the radius of the mass, and $\theta$ is the angle of the vertical. Equilibrium is achieved when $H\omega=MAR \sin \theta$. The angle $\theta$ is found by $\sin \theta=H\omega/MAR$. Keeping in mind the basic orientations for sensing both $V_E$ and the earth's rotational rate, the frame 13 will be rotated around the vertical axis at a constant rate ($\omega$) of 2 revolutions per second relative to its mounting (not shown). The first effect to be induced due to the rotation is the precession of the SA about the OA due to gyrodynamic forces causing the SRA to align to the average center of the frame rotation axis. This means from any starting position of the accelerometer measuring head, the SA will precess into the vertical plane with the OA and IA rotating in a horizontal plane. With the rotation direction shown as $\omega$, the instantaneous "space" velocity of the pendulous mass will vary over the range $V_E \pm 2\pi r\omega$. This can be visualized from FIG. 1 when in the position shown the pendulous mass is traveling in the same direction as $V_E$. When the frame has rotated 180°, the pendulous mass will be traveling in the opposite direction of $V_E$. If a radius V of 1 inch (measured horizontally along the OA from the vertical axis of rotation to the pendulous mass) is assumed for the pendulous mass, then the circle the mass would travel for each revolution would have a circumference of approximately 6 inches. If $\omega$ were 2 revolution per second, then the velocity of the mass along the circumference would be 1 foot per second. This means the constant peripheral velocity of 1521.65 feet per second would be modulated at a magnitude of ± 1 foot per second, which is 2 parts in 1500 or 1 part in 750, which is well within the capability range of the air bearing pendulous integrating gyroscopic accelerometer. This modulation is directly phased with alignment of the housing axis with the north-south meridian line, as shown in FIG. 2a. In addition to the velocity sensing provided by the unbalanced mass, the SA of the gyro will also precess due to the earth rate torque being applied about the input axis. This earth rate torque is generated by sensing the rotational motion of the earth. This motion is sensed by the gyro rotor remaining space fixed while the earth rotates. The earth rotation causes the outer housing 14 and frame 13 to move in a clockwise direction referenced to space coordinates. Conversely, the OA of the gyro appears to rotate counter-clockwise to an earth observer when viewed from the south end of the device looking north. At the beginning of its rotation (small angle approximation), the rate of movement of the OA to the case 14 is at earth's rotational rate. The displacement of OA about the case 14 is sensed by the pickup 70. The output of 70 is amplified by amplifier 71 and applied to servo motor 31. Motor 31 then applies a torque to the IA which is proportional to the original displacement rate, which rate is earth's rate. This torque is also directionally sensitive to the orientation of the SA and OA. The earth rate torque will precess the gyro at maximum earth rate when the OA is in the N-S plane. The precession direction caused by this torque is always in the same direction relative to the north-south axis of the earth. Consequently, the accelerometer (gyro rotor and output axis) is subjected to a change in velocity (which is an acceleration) and to a precessing torque of earth rate at the same time (see FIG. 2c). By proper construction, these two forcing functions can be made additive and will produce a directionally sensitive signal (from element 70 of FIG. 3, to be described below). The direction of spin of the gyro rotor (which establishes the angular momentum vector), and the direction of rotation of the frame 13 must be in such a direction as to cause the output axis motion to be in phase with (or additive to) the same motion of the output axis caused by the earth's rotation when the pendulous mass is on the south end of the north-south axis. The wave forms of FIG. 2 all use the same time abscissa. Reference numerals 30 and 31 designate a resolver and a servo motor, which will be described in more detail in the discussion of FIG. 3. FIG. 2c represents the electrical output signal of the resolver 30.

Referring now to a specific embodiment of the invention as shown in FIG. 3, the gyroscopic accelerometer is generally designated 40, and is mounted for rotation on bearing 41, with bearing 41 carried on a portion 42 of an incremental encoder. Portion 42 is normally stationary with respect to the adjacent surface of the earth. Another relatively rotatable portion 43 of the incremental encoder supports portion 42 on bearing 44. Portion 43 is mounted for rotation on bearing 45 and is driven by rotor 46 of a motor 47, with a stator 48 stationary with respect to the adjacent surface of the earth. Accelerometer 40 is also driven by motor 47, and turns at rate $\omega$ with encoder portion 43. Encoder portion 42 has a worm track 49 on the periphery thereof, and can be adjusted relative to the base about the frame rotation axis with a worm gear 50, by a shaft 51 adjustment knob 52. Shaft 51 and adjustment knob 52 are supported on stator 48 by means not shown.

Figure 4:
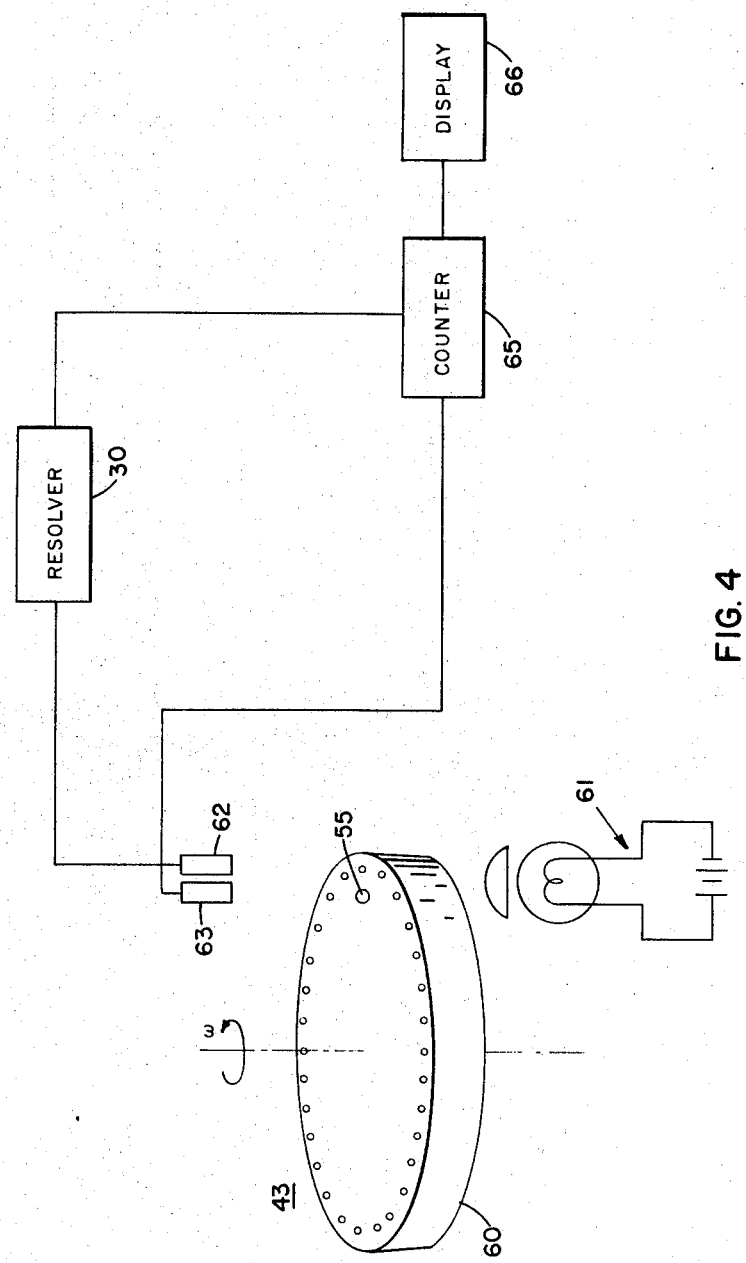
FIG. 4 shows a schematic diagram of the electronics of of the invention.

The operation of the incremental encoder may be easily understood by reference to FIG. 4. Encoder portion 43 includes a perforated disk 60, rotating with 40 and 46 at $\omega$. Disk 60 has associated therewith a light source 61 arranged to shine through the perforations of 60 as it revolves. The pulsating light from 61 is picked up by photocells 62 and 63. Encoders of this general type are well known in the art. With a $2^{18}$ encoder, approximately 262,000 pulses will be generated for each revolution of the disk. It is to be understood that light source 61 and photocells 62 and 63 are all supported by encoder portion 42, and do not rotate, except as 42 is adjusted, as described hereinafter.

As can be seen from FIG. 4 of the drawing, there is a circle of perforations near the outer edge of disk 60, and a single perforation 55 radially inward from the circle of perforations. The encoder portion 43 with its circle of perforations and the encoder portion 42 with its light source 61 and photocell 62 provide position pulses as the frame rotates, while the portion 43 with its perforation 55 and the portion 42 with its light source 61 and photocell 63 provide position datum pulses. The circle of perforations provides pulses to photocell 62, which pulses are then passed through two-winding resolver 30 to a counter 65. Resolver 30 is mounted on frame 13 and has one of its windings physically rotated by gearing connected to shaft 81 attached to the outer housing 14 of the gyroscope (see FIG. 3). The gear ratio is the function of the desired amount of travel of the resolver for a given input motion. This ratio is based on the desired linearity and scale factor. It is also a function of the sensitivity of the accelerometer which is dependent on the H of the wheel and the speed of rotation of frame 13 about the vertical axis. The single perforation provides a pulse for photocell 63 for each revolution of disk 60, and causes counter 65 to "clear" itself and begin counting again. A display device 66 is connected to counter 65 and provides a visual display of the count contained in counter 65. Resolver 30, in half of its revolution, will provide negative pulses, and in the other half, will provide positive pulses. Counter 65 will only respond to positive pulses.

As accelerometer 40 rotates, the precessional forces from the unbalanced mass will cause the outer housing 14 (supported by axle 81) to dither about the IA axis. This dithering movement causes a change in the output voltage of resolver 30. A resolver possesses the ability to invert the phrase of a signal when it passes through null. As indicated in FIG. 2c, the resolver output (or envelope) goes through the null. When a signal of one phase is applied to the primary winding of a resolver, the phase of that signal is inverted in the output when the resolver is rotated through null. This is how negative and positive signals can be generated by the resolver. If a gear ratio of 10 for gears 74 and 75 were used, and case 14 had an oscillation angle of 0.1°, the motion of the resolver 30 would be approximately a degree. This would be initially set to oscillate through null. The display will indicate zero (0) counts only when the encoder stator 42 is positioned such that the photocell detectors 63 and 62 (which are mounted on 42) are directly north of the vertical rotating axis. The counter system is set to trigger on positive going pulses generated from the resolver crossover. This allows only one position in 360° where the counter is started and stopped simultaneously, and no counts can accumulate.

A capacitive pickup 70 is attached to housing 14, and feeds a servo amplifier 71, which controls a servo motor 31, which motor is used to balance out frictional precessions of housing 14, in the manner as taught by the Mueller patent.

As can be seen by FIG. 3, servo motor 31 has its shaft attached to a gear 73, which meshes with another gear 74 attached to the axle supporting housing 14 about axis IA. Resolver 30 has gear 75 attached to its shaft, and meshing with gear 74.

The initial setup of the device is as follows: the device is started and the count shown by display 66 is observed. Worm gear 50 is manually adjusted by knob 52 and shaft 51. Adjustment of gear 50 moves encoder portion 42, which carries photocells 62 and 63. When photocells 62 and 63 are in the correct position, no counts will be stored by counter 65, and display 66 will so indicate. This indicates that the photocells are aligned to a north-south meridian. A mirror 80 is then secured to portion 42. For the initial setup of the device, a north-south line is established from means external to the invention, and brought to mirror 80. This mirror is then adjusted perpendicular to this line by autocollimation. The mirror could also be adjusted with respect to the position of the photocells, without the use of any externally determined line.

Once mirror 80 is properly attached, the device may be used elsewhere to give a north-south line. The device is started, the encoder portion 42 is adjusted to show a minimum or zero count on display 66, and a theodolite or the like, by autocollimation, establishes a line perpendicular to mirror 80. This line is then north-south.

While a specific embodiment of the invention has been shown, other embodiments may be ovious to one skilled in the art, in light of this disclosure. For example, other types of encoders besides optical may be used, such as magnetic. Also, other ways of utilizing or laying a north-south line besides autocollimation of mirror 80 may be used, such as a synchro transmitter attached to 42, feeding a synchro receiver employed as a compass repeater, or merely an arrow painted on 42.

If desired, the invention could operate automatically. A sensor could be connected to counter 65 or to encoder 42 and could control means for adjusting 42 until the count from 42 minimized.

What is claimed is:

1. A north-seeking system including: a pendulous integrating gyroscopic accelerometer, said accelerometer including an inner housing; a gyroscopic rotor rotatable relative thereto about a substantially vertical first axis thereof and supported by said inner housing; an outer housing supporting said inner housing for rotation about a substantially horizontal second axis longitudinal to said outer housing; an axle; said outer housing being pivotably supported about a third axis orthogonal to said second axis and substantially orthogonal to said first axis by said axle; a frame; said axle supported by said frame, said inner housing being unbalanced about said second axis; means comprising a base and drive means thereon for rotating said frame relative to said base about a fourth axis orthogonal to said third axis and substantially perpendicular to an earth tangent plane, said outer housing having means sensing the relative angular displacement of said housings, a resolver connected to said sensing means; pulsing means in circuit with said resolvers including means for providing second axis position pulses and means comprising a portion settable about said fourth axis relative to said base for providing position datum pulses as said frame rotates; counting means having an input terminal and a reset terminal, said means for providing second axis position pulses connected to said input terminal, said means for providing position datum pulses connected to said reset terminal; and indicating means connected to said counting means.

2. The system as defined in claim 1, further including means for adjusting said settable portion about said fourth axis.

3. The system as defined in claim 2, further including means attached to said settable portion for indicating north.

References Cited

UNITED STATES PATENTS

| | | | |
|---|---|---|---|
| 2,925,736 | 2/1960 | Mueller | 74—5.6 |
| 2,954,700 | 10/1960 | Deschamps | 74—5.34 |
| 3,071,012 | 1/1963 | Baring-Gould | 74—5.34 |
| 3,162,052 | 12/1964 | Anderson et al. | 73—504 |
| 3,318,160 | 5/1967 | Erdley et al. | 74—5 |
| 1,932,412 | 10/1933 | Keen | 33—226 |
| 2,981,113 | 4/1961 | Erdley | 33—226(Z)UX |
| 3,307,412 | 3/1967 | Granqvist | 74—5.6 |

FOREIGN PATENTS

| | | | |
|---|---|---|---|
| 106,170 | 5/1917 | Great Britain | 33—226 |
| 1,141,995 | 3/1957 | France | 33—(0) |

ROBERT B. HULL, Primary Examiner

U.S. Cl. X.R.

74—5.6